June 27, 1933.   M. D. MANN, JR., ET AL   1,915,433
METHOD AND APPARATUS FOR COOLING FILTER AND
RECOVERING RETAINED OIL FROM CLAY
Filed May 31, 1930
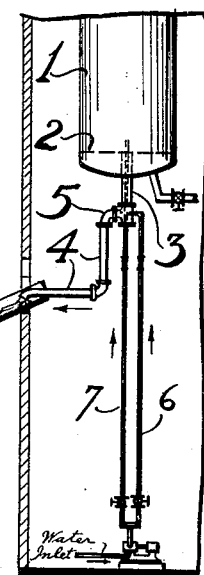
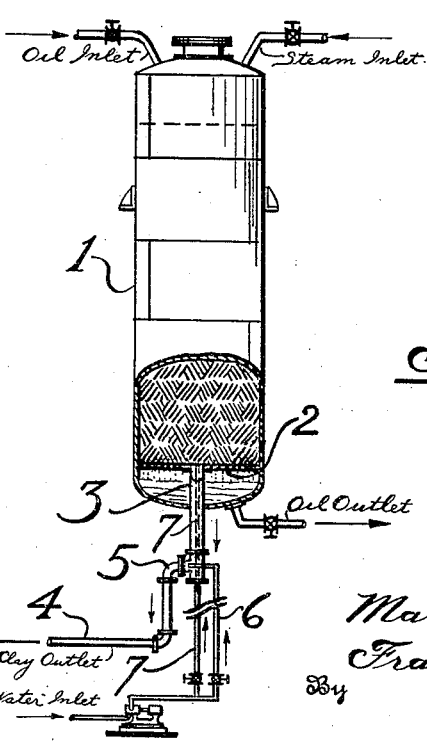
Fig.-2
Fig.-1
Inventors
Matthew D. Mann, Jr.
Francis M. Archibald
By
W. E. Currie Attorney Patented June 27, 1933

1,915,433

UNITED STATES PATENT OFFICE

MATTHEW D. MANN, JR., OF ROSELLE, AND FRANCIS M. ARCHIBALD, OF ELIZABETH, NEW JERSEY, ASSIGNORS TO STANDARD OIL DEVELOPMENT COMPANY, A CORPORATION OF DELAWARE

METHOD AND APPARATUS FOR COOLING FILTER AND RECOVERING RETAINED OIL FROM CLAY

Application filed May 31, 1930. Serial No. 458,097.

This invention relates to a method and apparatus for removing spent clay from filters or filter presses and simultaneously recovering oil from the spent clay.

The main object of the invention is to remove the spent clay from the filter and recover the retained oil by an operation which will make the filter available for further operations in the shortest possible time.

The second object of the invention is to allow the recovery of the oil which is retained by the clay in the filter.

There are two principal methods of treating oils, such as lubricating oils, white oils, etc., with clay. The first method, which is called the percolation method, consists in passing the oil through the stationary layer of clay at ordinary room temperature or at slightly higher temperature. The second method consists in agitating oil with clay and separating the clay from the oil in a filter press. The first method employs long contact time, the second one short contact time. Both methods leave a layer of clay in the filter or filter press, containing oil both absorbed and retained between the interstices of the clay. It has been customary to remove the largest part of this oil by washing the spent clay in situ with naphtha or other light solvents and displacing the naphtha or other solvent with steam. This method has the disadvantage of fire hazard and of the necessity of separating the naphtha from the lubricating oil by distillation. The naphtha also dissolves a large part of the impurities absorbed by the clay and the recovered oil becomes contaminated therewith. Another disadvantage of this method, which becomes especially serious in the case of filtration by percolation at or around ordinary room temperature, consists in the fact that the steaming out operation raises the temperature of the filter too high and much time is lost in cooling down the filter to the treating temperature.

The present invention eliminates these disadvantages and embodies several advantageous features. It will be understood from the following description read in conjunction with the drawing in which;

Fig. 1 is a diagrammatic representation, partly in section, partly in elevation, of a filter provided with means for removing the clay according to the present invention and, Fig. 2 is an elevation showing the treater and the means for separating the oil.

In Fig. 1, numeral 1 designates the usual filter used in the percolation treating method provided with a false bottom 2 on which the clay rests. A vertical discharge pipe 3 is connected with the false bottom on the one end and with the discharge line 4 on the other end joined to 3 by means of a T and a nipple 5. Valved water pipes 6 and 7, fed either from a hydrant or by means of a pump, are provided for flushing the clay out of the filter and preventing clogging of the discharge pipe 3 by clay.

In Fig. 2 discharge line 4 is shown connected with a vat or settling tank 9 by means of a trough 8. Tank 9 is provided with valved outlet pipes at certain levels. 10 is a filter connected with the bottom of the settling tank by line 11. 12 is a conveyor.

The operation is the following:

The filter 1 is charged with clay to the required level whereby the vertical discharge line 3 also becomes filled with clay. The end of the T joint which is connected with nipple 5 is preferably sealed. After passing oil through the filter and when it is desired to remove spent clay the seal between the nipple and T is removed, the valves of water pipes 6 and 7 are opened and the clay gradually flushed out of the filter and removed through lines 3, 4 and trough 8 into the settling tank 9. During the flushing out operation the large amount of water disintegrates the lumps of spent clay and liberates the oil in the interstices of the clay layer. Three layers are obtained in the settling tank 9, viz., an upper oil layer, an intermediate water layer and a lower layer, consisting of a slurry of clay and water. The water and oil layers are removed by the discharge lines and the clay slurry is forwarded through line 11 into filter press 10 or other means for separating most of the water from the clay. In the press the clay is freed from the major part of water and is then discharged upon the conveyor 12, which forwards it to storage for the purpose of burning and revivifying or for any other use.

The temperature of the water for washing may be chosen so that when mixed with the hot clay the mixture shall not have a temperature substantially above 180° F. The best extraction temperature is around 120-150° F. Lower temperatures may also be employed although warm water gives a better extraction respectively separation of the oil from the clay.

The following example will serve to illustrate our process:

In the preparation of white medicinal oils the half-finished oil is treated with clay at a temperature of 25° C. After the filter is drained 75% of oil is left in the clay on the basis of the dry clay, i. e., 100 pounds of clay hold 75 pounds of oil. By the described water extraction process about 96% of the oil amounting to 72% on the basis of dry clay is recovered. The temperature of the water is about 140-150° F. The time of the total operation is 10 hours and the temperature of the treating room hardly changes during this flushing out operation. Using the old method of naphtha washing, steaming and dumping, the temperature of the treating room rises to 35° C. and the time of the total operation amounts to 70 hours. This example illustrates the practical value of our process in saving time necessary for removing spent clay and recovering the retained oil.

We claim:

1. Method of removing spent clay from filter or filter press and recovering retained oil, comprising flushing out clay from a filter with a large amount of water by injecting the water against the bottom of the spent clay layer in the filter, and separating the flushed out clay into oil, water and a slurry of clay.

2. In combination with a filter or filter press for oils, means for removing spent clay therefrom and recovering retained oil from the clay, comprising a discharge line at the lower part of the filter or filter press, means for injecting water against the bottom of the spent clay layer in the filter, a settling tank connected with said discharge line, separate means for removing oil and water from the settling tank, a filter press for separating water from clay and means for forwarding a slurry of clay and water from the settling tank into the last mentioned filter press.

3. The apparatus according to claim 2 in which a separate water pipe is provided in the discharge line for preventing the clogging of the line by clay.

4. In combination, a filter including a container and a body of oil saturated clay disposed in the container, an inlet pipe opening into the container for injecting liquid against a bottom surface of the body of clay, a discharge pipe for discharging mixed clay and liquid from the lower portion of the container, and means for injecting a jet of liquid into the discharge pipe in the direction of travel of the mixed clay and liquid.

5. In combination, a filter including a container and a body of oil saturated clay disposed in the container, an inlet pipe opening into and terminating adjacent the bottom of the container for injecting liquid against the under surface of the body of clay, and a discharge pipe telescopically disposed with respect to and spaced from the inlet pipe leading from the bottom of the container for discharging mixed clay and liquid from the container.

6. The method of recovering spent clay and oil from an oil filtering device which comprises injecting wash water against the under surface of the body of clay in the filtering device to wash clay and oil from the body in successive increments, removing the resulting mixture from the filtering device, and stratifying the mixture to separate the oil from the clay and wash water.

7. In combination with means for filtering oil, means for removing spent clay from the filtering means and recovering retained oil from the clay, said removing means comprising a discharge line at the lower part of the filtering means, a line for injecting water against the bottom of the spent clay layer, a settling tank connected with said discharge line, and separate means for removing oil, water and clay from the settling tank.

MATTHEW D. MANN, Jr.
FRANCIS M. ARCHIBALD.